(12) United States Patent  
Stafford et al.

(10) Patent No.: US 10,206,096 B2  
(45) Date of Patent: Feb. 12, 2019

(54) DEVICE QUERYING OF SERVICE ENTITLEMENT STATUS

(71) Applicant: AT&T INTELLECTUAL PROPERTY I, L.P., Atlanta, GA (US)

(72) Inventors: Matthew Wayne Stafford, Austin, TX (US); Qun Wei, Redmond, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 15 days.

(21) Appl. No.: 15/460,128

(22) Filed: Mar. 15, 2017

(65) Prior Publication Data

US 2018/0270648 A1  Sep. 20, 2018

(51) Int. Cl.
*H04W 8/20* (2009.01)
*H04W 8/24* (2009.01)
*H04L 29/06* (2006.01)

(52) U.S. Cl.
CPC .......... *H04W 8/20* (2013.01); *H04L 65/1006* (2013.01); *H04W 8/24* (2013.01)

(58) Field of Classification Search
CPC ........ H04W 8/20; H04W 8/24; H04L 65/1006
See application file for complete search history.

(56) References Cited

U.S. PATENT DOCUMENTS 6,714,519 B2 *  3/2004  Luzzatti  .............. H04L 12/6418  
370/252  
8,014,497 B2 *  9/2011  Brunson  ........... H04L 29/06027  
370/352  
8,126,439 B1 *  2/2012  Sankaranaraynan  ........................  
H04L 65/1069  
455/414.1

(Continued)

FOREIGN PATENT DOCUMENTS

DE  102006057817 A1  6/2008  
EP  1931109 A1  11/2011

(Continued)

OTHER PUBLICATIONS

"MBB Network Capability Exposure White Paper", wwwfile.huawei.com, Jun. 9, 2015. [http://wwwfile.huawei.com/~/media/CORPORATE/PDF/white%20paper/MBB%20Network%20Capability%20Exposure%20White%20Paper.pdf]. Retrieved on Feb. 23, 2017, 12 pages.

(Continued)

*Primary Examiner* — Babar Sarwar  
(74) *Attorney, Agent, or Firm* — Amin, Turocy & Watson, LLP

(57) ABSTRACT

Device querying of service entitlement is presented herein. A method can comprise receiving a provisioning rule representing that a barred service is to be excluded from a group of available services that are available to a subscriber, receiving, from a user equipment, a first message representing that the user equipment is equipped to facilitate a performance of the barred service, in response to receiving, from the user equipment, a second message comprising a request for the group of available services, and in response to determining, based on the first message, that the user equipment is equipped to facilitate the performance of the barred service, excluding the barred service from the group of available services resulting in a modified group of available services, and sending a third message comprising the modified group of available services directed to the user equipment.

20 Claims, 12 Drawing Sheets

(56) References Cited

U.S. PATENT DOCUMENTS

| | | | | |
|---|---|---|---|---|
| 8,280,957 | B2* | 10/2012 | Wu | H04M 3/42365 709/204 |
| 8,396,074 | B1* | 3/2013 | McNamara | H04L 67/104 370/466 |
| 8,769,076 | B2* | 7/2014 | Boberg | H04L 67/24 709/223 |
| 8,818,327 | B2* | 8/2014 | Shaikh | H04L 65/1016 455/405 |
| 9,451,449 | B1* | 9/2016 | Binafif | H04M 3/42365 |
| 9,456,080 | B2* | 9/2016 | Moon | H04L 29/06027 |
| 9,549,073 | B2* | 1/2017 | Zitnik | H04L 51/38 |
| 2004/0153547 | A1* | 8/2004 | Trossen | H04L 29/06 709/228 |
| 2004/0205175 | A1* | 10/2004 | Kammerer | H04L 29/06 709/223 |
| 2006/0031368 | A1* | 2/2006 | deCone | G06F 9/546 709/207 |
| 2006/0148477 | A1* | 7/2006 | Reilly | H04L 67/24 455/436 |
| 2007/0280453 | A1* | 12/2007 | Kelley | H04L 67/16 379/201.01 |
| 2009/0143086 | A1* | 6/2009 | Jeong | H04L 67/24 455/466 |
| 2010/0330960 | A1* | 12/2010 | Ravishankar | H04M 3/2281 455/410 |
| 2011/0053620 | A1* | 3/2011 | Jarvenpaa | H04L 67/24 455/466 |
| 2012/0142318 | A1* | 6/2012 | Okon | H04W 4/21 455/413 |
| 2012/0311045 | A1* | 12/2012 | Sylvain | H04L 51/12 709/206 |
| 2013/0040604 | A1* | 2/2013 | Sprigg | H04L 51/12 455/410 |
| 2013/0268357 | A1* | 10/2013 | Heath | H04L 63/00 705/14.53 |
| 2016/0309529 | A1* | 10/2016 | Li | H04W 12/06 |

FOREIGN PATENT DOCUMENTS

| | | |
|---|---|---|
| KR | 20060112145 | 10/2006 |
| KR | 20110058342 A | 6/2011 |
| WO | 2014031245 A1 | 2/2014 |
| WO | 2015069154 A1 | 5/2015 |

OTHER PUBLICATIONS

Bergmann et al., "A Framework for Aggregation of Presence Information Based on User Provisioned Rules," Dissertation, Vorgelegt im Fachbereich 3 (Mathematik and Informatik) der Universitat Bremen, Nov. 2006, 290 pages.

Hsu et al. "Implementation of IMS based PoC service with contextaware interaction." International Journal of Multimedia and Ubiquitous Engineering 3.4 (Oct. 2008): 25-43. 20 pages.

"Video Share", Wikipedia. [https://en.wikipedia.org/wiki/Video_Share]. Retrieved on Jun. 25, 2017, 6 pages.

"Rich Communication Services", Wikipedia. [https://en.wikipedia.org/wiki/Rich_Communication_Services]. Retrieved on Jun. 25, 2017, 5 pages.

"AT&T Launches Video Calling and Advanced Messaging", AT&T, Nov. 20, 2015. [http://about.att.com/newsroom/video_calling_and_advanced_messaging].html. Retrieved on Jun. 25, 2017, 2 pages.

"MSISDN", Wikipedia. [https://en.wikipedia.org/wiki/MSISDN]. Retrieved on Jun. 25, 2017, 2 pages.

Prokop, Andrew. "SIP Subscribe, Notify, and Publish", Jun. 21, 2013, [https://andrewjprokop.wordpress.com/2013/06/21/sip-subscribe-notify-and-publish]. Retrieved on Jun. 25, 2017, 8 pages.

Prokop, Andrew. "A Deep Dive Into SIP Subscriptions", Mar. 11, 2015, [https://andrewjprokop.wordpress.com/2015/03/11/a-deep-dive-into-sip-subscriptions]. Retrieved on Jun. 25, 2017, 7 pages.

Prokop, Andrew. "A Deep Dive Into the SIP Publish Method", Mar. 17, 2015, [https://andrewjprokop.wordpress.com/2015/03/17/a-deep-dive-into-the-sip-publish-method]. Retrieved on Jun. 25, 2017, 7 pages.

"Video over LTE", Wikipedia. [https://en.wikipedia.org/wiki/Video_over_LTE]. Retrieved on Jun. 25, 2017, 1 page.

"Presentity", Wikipedia. [https://en.wikipedia.org/wiki/Presentity]. Retrieved on Jun. 25, 2017, 1 page.

"Presence information", Wikipedia. [https://en.wikipedia.org/wiki/Presence_information]. Retrieved on Jun. 25, 2017, 3 pages.

"Presence service", Wikipedia. [https://en.wikipedia.org/wiki/Presence_service]. Retrieved on Jun. 25, 2017, 1 page.

* cited by examiner

DEVICE QUERYING OF SERVICE ENTITLEMENT STATUS

TECHNICAL FIELD

The subject disclosure generally relates to embodiments for device querying of service entitlement status.

BACKGROUND

Although a mobile device of a subscriber of a wireless communication service can support rich communication suite (RCS) service(s), the subscriber may not be entitled to utilize such service(s), e.g., when an associated subscription is not compatible with the RCS service(s), when the subscriber blocks use of such services (e.g., via a parental control block), when such services are disabled by an owner, purchaser, etc. (e.g., an employer) of such RCS service(s), etc. In this regard, "false positives" can result when the mobile device communicates its device status while not being aware of a subscriber's actual service entitlement status. Consequently, conventional communication network technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
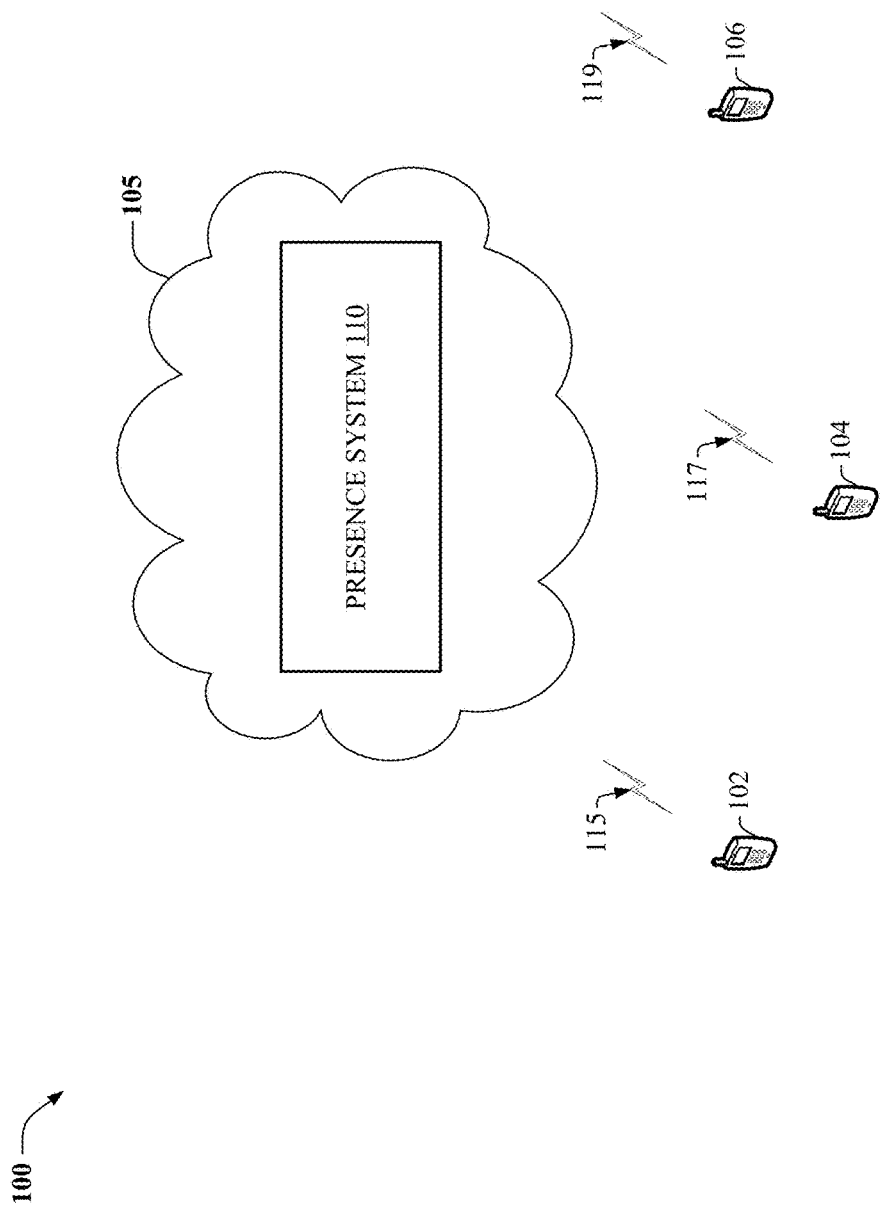
FIG. 1 illustrates a communication environment for facilitating device querying of service entitlement status, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional communication network technologies have had some drawbacks with respect to a mobile device communicating device capabilities that are incompatible with an associated subscriber's service entitlement status. Various embodiments disclosed herein can improve subscriber experiences by enabling a device to determine a service entitlement status of a subscriber, and modify operation of the device based on such status.

For example, a method can comprise receiving, by a presence system, server, etc. a provisioning rule representing that a barred service is to be excluded from a list, group, etc. of available services that are available to a subscriber, e.g., associated with a service provider of the available services. In embodiment(s), the barred service can comprise, e.g., an RCS service, an IR.94 based video service, a chat service conducted pursuant to an open mobile alliance (OMA) protocol, etc.

The method can further comprise receiving, by the presence system from a user equipment (UE) of the subscriber, a publish message, e.g., a session initiation protocol (SIP) PUBLISH message, representing service capabilities of the UE, e.g., representing that the UE is equipped to facilitate a performance of the barred service. Further, the method can comprise receiving, by the presence system from the UE, a subscribe message, e.g., an SIP SUBSCRIBE message representing, comprising, etc. a query, request, etc. for provisioned capabilities of the UE, e.g., comprising a list, group, etc. of available services.

In this regard, in response to receiving the SIP SUBSCRIBE message, and in response to determining, based on the SIP PUBLISH message, that the UE is equipped to facilitate the performance of the barred service, the method can further comprise excluding the barred service from the list, group, etc. of available services resulting in a modified list, group, etc. of available services, and sending a notify message, e.g., an SIP NOTIFY message, comprising the modified list, group, etc. of available services directed to the UE. In turn, as described below, the UE can differentiate its behavior based on the modified list, group, etc. of available services, e.g., preventing, disabling, etc. the UE from initiating a performance of the barred service.

In an embodiment, a system, e.g., a presence server, can comprise a processor and a memory that stores executable instructions that, when executed by the processor, facilitate performance of operations, comprising: receiving, from a provisioning device, e.g., a provisioning server, a provisioning rule that facilitates exclusion of a service, e.g., an RCS service, a video service, a chat service, etc. from a list, group, etc. representing provisioned services corresponding to a communication device.

Further, the operations can comprise receiving, from the communication device, a publish, e.g., SIP PUBLISH, message representing capabilities of the communication device, e.g., representing that the communication device is capable of facilitating a performance of the service; receiving, from the communication device, a subscribe, e.g., SIP SUBSCRIBE, message (e.g., comprising an integrated services digital network (ISDN) directory number identifying the communication device) requesting confirmation of a subscription capability of the communication device; and in response to the receiving the subscribe message, and determining, based on the publish message, that the communication device has published support for facilitation of the performance of the service, the method further comprises excluding, based on the provisioning rule, the service from the list, group, etc. representing the provisioned services—resulting in a modified group. In turn, the method further comprises sending a notify, e.g., SIP NOTIFY, message comprising the modified list, group, etc. directed to the communication device, e.g., enabling the communication device to tailor its behavior accordingly.

In one embodiment, a machine-readable storage medium can comprise executable instructions that, when executed by a processor of a device, e.g., a UE, facilitate performance of operations, comprising: sending an SIP PUBLISH message directed to a presence server—the SIP PUBLISH message representing the UE is equipped to facilitate a performance of a communication service, e.g., an RCS service, an IR.94 based video service, an OMA based chat service, etc.; in response to the sending the SIP PUBLISH message, sending an SIP SUBSCRIBE message (e.g., comprising an ISDN directory number corresponding to the UE) directed to the presence server—the SIP SUBSCRIBE message comprising a query of a subscription capability of the UE; and in response to the sending the SIP SUBSCRIBE message, receiving, based on a provision rule applicable to exclude the communication service from the subscription capability of the UE, an SIP NOTIFY message comprising the subscription capability from the presence server device.

In another embodiment, in response to the receiving the SIP NOTIFY message, the operations can further comprise disabling a feature of the device corresponding to the communication service. In yet another embodiment, the disabling the feature comprises preventing a representation, e.g., an icon, a menu item, etc. of the communication service from being displayed in a display of the device. In an embodiment, in response to the receiving the SIP NOTIFY message, the operations can further comprise inactivating the performance of the communication service.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

Now referring to FIGS. 1-4, a communication environment (100) for facilitating device querying of service entitlement status, a block diagram of a presence system 110, another communication environment (300) for facilitating device querying of service entitlement status, and a block diagram of a user equipment (102) are illustrated, respectively, in accordance with various embodiments. In various aspects, presence system 110 can be coupled to a device (see e.g., 102, 104, 106, etc.), e.g., a wireless communication device, a smartphone, a laptop device, a tablet device, a television device, a vehicle device, a home security system device, a gaming console device, UE, etc. via a wired interface (not shown) and/or a wireless interface (see e.g., 115, 117, 119). The wireless interface can be an over-the-air wireless link comprising a downlink (DL) and an uplink (UL) (both not shown) that can utilize a predetermined band of radio frequency (RF) spectrum associated with, e.g., cellular, long term evolution (LTE), LTE advanced (LTE-A), global system for mobile communication (GSM), third generation partnership project (3GPP) universal mobile telecommunication system (UMTS), Institute of Electrical and Electronics Engineers (IEEE) 802.XX technology (WiFi, Bluetooth, etc), worldwide interoperability for microwave access (WiMax), wireless local area networks (WLAN), Femto, etc. Accordingly, the device can be associated with such predetermined radio frequency (RF) spectrum.

Service provider network 105 can include software and/or hardware configured to provide connectivity between presence system 110 and the device. In this regard, communication environment 100 and communication environment 300 can include one or more: macro, Femto, or pico access points (APs) (not shown); base stations (BS) (not shown); landline networks (e.g., optical landline networks, electrical landline networks) (not shown) communicatively coupled between presence system 110 and the device. In various embodiments, presence system 110 can communicate via any number of various types of wireless technologies including, but not limited to, cellular, WiFi, WiMax, WLAN, Femto, etc. In corresponding embodiments, service provider network 105 can provide cellular, WiFi, WiMAX, WLAN, and/or other technologies for facilitating such communication.

Further, service provider network 105 can include one or more of the Internet (or another communication network (e.g., an Internet protocol (IP) based network)), or a digital subscriber line (DSL)-type or broadband network facilitated by Ethernet or other technology. In this regard, service provider network 105 can include a cloud-based, centralized, communication platform, Internet platform, wide area network, etc., and component(s), portion(s), etc. of presence system 110, e.g., provisioning server 210, presence server 220, etc. can be implemented within the cloud-based, centralized, communication platform.

Figure 2:
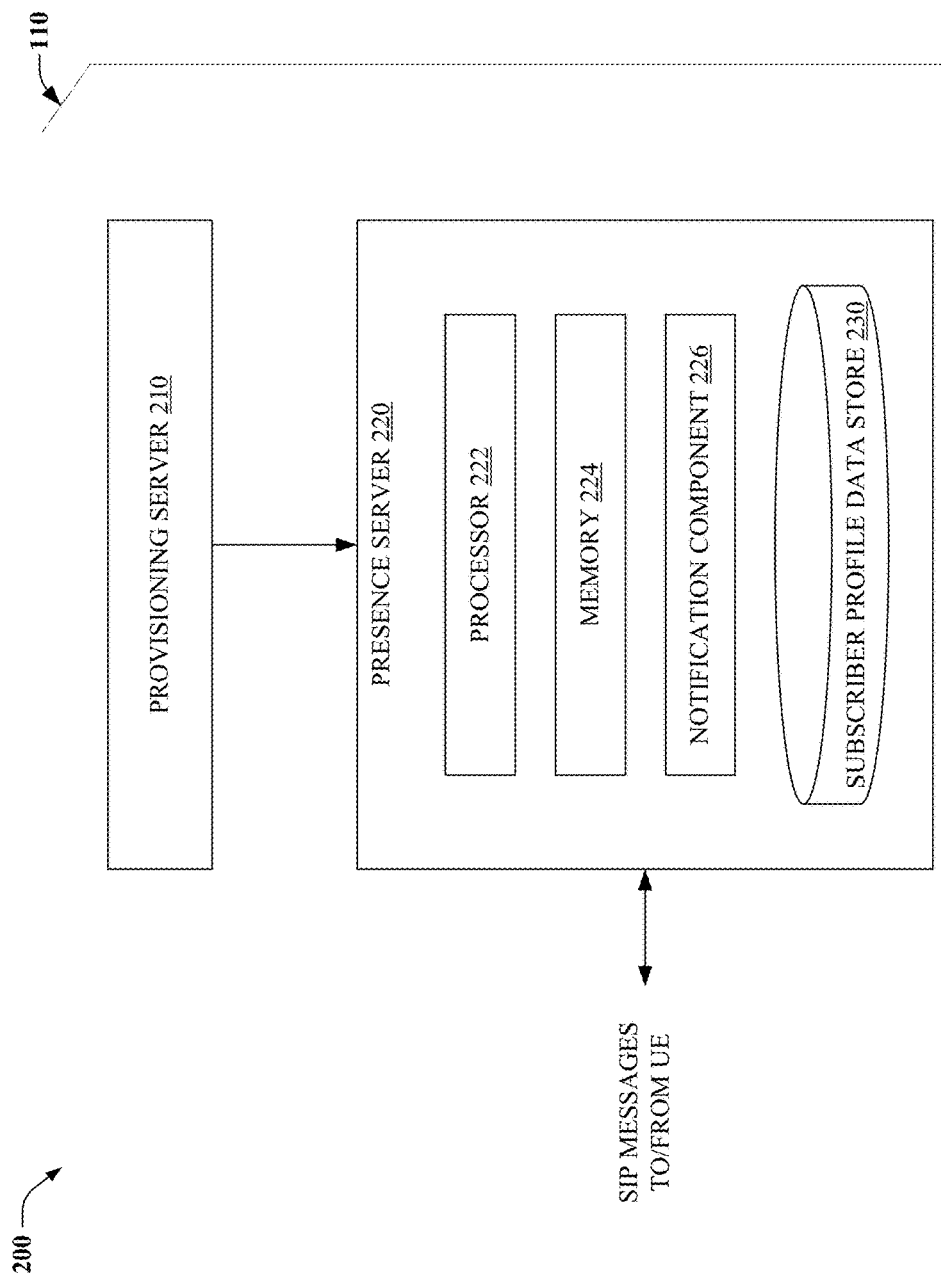
FIG. 2 illustrates a block diagram of a presence system, in accordance with various example embodiments.

As illustrated by FIG. 2, presence system 110 can include provisioning server 210 and presence server 220. Provisioning server 210 can be configured, based on subscription information representing subscription capabilities of a subscriber of telecommunications service(s) provided by service provider network 105, to derive an entitlement status of the subscriber.

For example, in various embodiment(s), provisioning server 210 can determine whether a subscription of the subscriber comprises a first service that is not compatible with a second service (e.g., an RCS service), whether the subscriber does not want an RCS service (that the subscriber has subscribed to) to be enabled, e.g., based on parental control of access to the service, whether access to the RCS service has been prevented, disabled, etc. by an entity employer, etc.

Presence server 220, e.g., a system comprising processor 222, memory 224, notification component 226, and subscriber profile data store 230, can receive, from provisioning server 210, a provisioning rule representing the entitlement status of the subscriber, and store the provisioning rule in subscriber profile data store 230. In an embodiment, the provisioning rule can represent a service, e.g., an RCS service, a video service, a chat service, etc. to be filtered, excluded, etc. from a list, group, etc. representing provisioned services corresponding to the subscriber.

As described above, false positives can result when a mobile device communicates its capabilities while not being aware of an associated subscriber's actual service entitlement status. In this regard, when a subscriber using a device is notified, e.g., via a graphical user interface (GUI) of the device, that another person is entitled to use a service, e.g., an IR.94 based video calling service, the user can erroneously believe that he/she is entitled to use the IR.94 based video calling service, and attempt to initiate the IR.94 service with failure.

Figure 3:
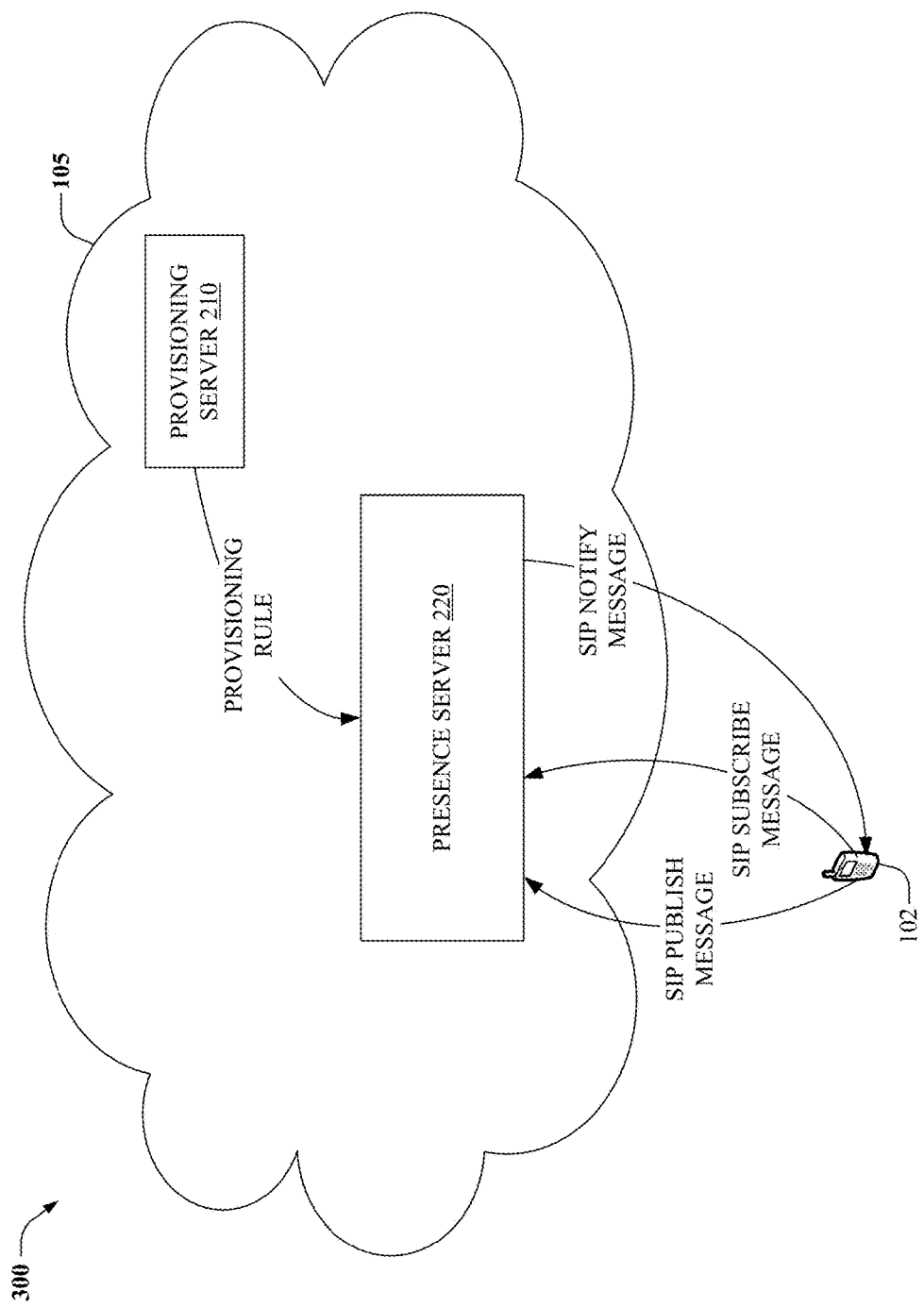
FIG. 3 illustrates another communication environment for facilitating device querying of service entitlement status, in accordance with various example embodiments.

To correct for these and other inadequacies of conventional communication network technologies, and now referring to FIG. 3, presence system 110 can facilitate device querying of service entitlement, e.g., enabling a device to prevent, disable, etc. features of the device based on the service entitlement status of the subscriber.

In this regard, notification component 226 can receive, from the device, e.g., 102, 104, 106, etc. an SIP PUBLISH message representing capabilities of the device, e.g., representing that the device is capable of facilitating a performance of a service, e.g., an IR.94 based video calling service. Further, notification 226 can receive, from the device, an SIP SUBSCRIBE message requesting confirmation of a subscription capability of the device, of the subscriber, etc. In embodiment(s), the SIP SUBSCRIBE message can comprise an ISDN mobile telephone number identifying the device.

In turn, in response to receiving the SIP SUBSCRIBE message from the device, and in response to determining, based on the SIP PUBLISH message, that the device has published support for facilitation of the performance of the service, notification component 226 can determine, via subscriber profile data store 230, whether the service entitlement status of the subscriber comprises the service.

In this regard, in response to determining, via subscriber profile data store 230, that the service entitlement status of the subscriber does not comprise the service, notification component 226 can filter, exclude, etc. the service, e.g., as a excluded service, banned service, etc. from the list, group, etc. representing the provisioned services corresponding to the subscriber—resulting in a modified list, group, etc. In turn, notification component 226 can send an SIP NOTIFY message comprising the modified list, group, etc. to the device. As described below, such information can enable the device to tailor its behavior accordingly, e.g., preventing the subscriber from attempting to initiate, from the device, the excluded service, banned service, etc.

Figure 4:
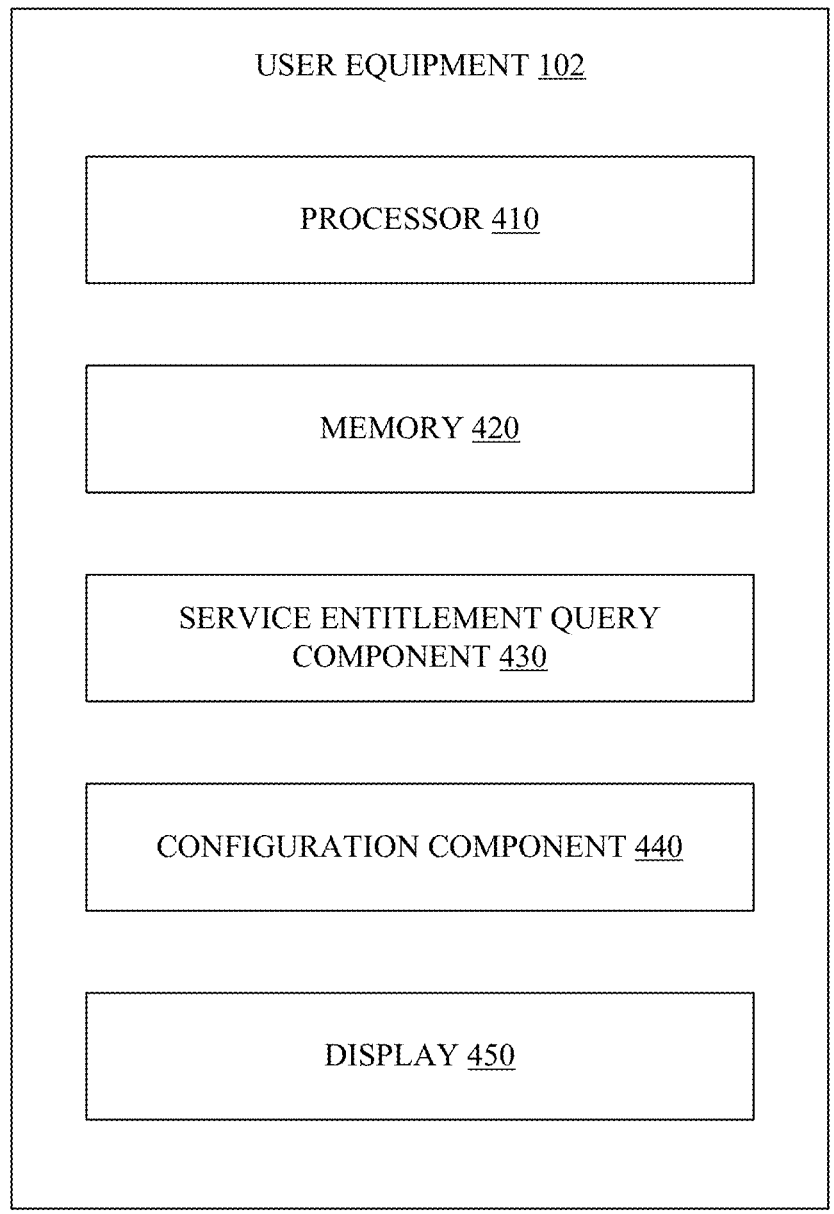
FIG. 4 illustrates a block diagram of a user equipment, in accordance with various example embodiments.

Now referring to FIG. 4, the device, e.g., UE 102, can comprise processor 410, memory 420, service entitlement query component 430, configuration component 440, and display 450. Service entitlement query component 430 can send an SIP PUBLISH message directed to presence server 220—the SIP PUBLISH message representing UE 102 is equipped to facilitate a performance of a communication service, e.g., an RCS service, an IR.94 based video service, an OMA based chat service, etc.

In response to the sending the SIP PUBLISH message, service entitlement query component 430 can send an SIP SUBSCRIBE message, e.g., comprising an ISDN directory number corresponding to UE 102, to presence server 220— the SIP SUBSCRIBE message comprising a query of a subscription capability of UE 102.

Further, in response to the sending the query of the subscription capability of UE 102 to presence server 220, service entitlement query component 430 can receive, from presence server 220 based on a provision rule applicable to exclude the communication service from the subscription capability of UE 102, an SIP NOTIFY message comprising a group, list, etc. representing provisioned services corresponding to the subscription capability of UE 102—the communication service being excluded from the group, list, etc.

In turn, in response to the receiving the SIP NOTIFY message from presence server 220, configuration component 440 can modify operation of UE 102 according to the subscription capability of UE 102. For example, in an embodiment, configuration component 440 can select, alter, etc. menu options, network bearer options, control options, etc. to be presented in a graphical user interface (GUI) corresponding to display 450 based on the subscription capability, e.g., service entitlement status, etc. of UE 102.

In one embodiment, in response to a determination that the communication service, e.g., an excluded communication service, has been excluded from the group, list, etc., configuration component 440 can prevent menu options, etc. corresponding to the excluded communication service from being displayed in a selection menu of the GUI.

In another embodiment, in response to the determination that the communication service has been excluded from the group, list, etc., configuration component 440 can prevent a representation, e.g., an icon, menu item, graphic element, etc. corresponding to the excluded communication service from being displayed in display 450.

In yet another embodiment, in response to the determination that the communication service has been excluded from the group, list, etc., configuration component 440 can render, graphically render, etc., via display 450, an icon, graphic element, etc. corresponding to the excluded communication service in a way, e.g., a color, a symbol, a fill pattern, etc. that is different from another color, symbol, fill pattern, etc. representing the communication service has been included in the group, list, etc. representing provisioned service corresponding to the subscription capability of UE 102.

In an embodiment, in response to the determination that the communication service has been excluded from the group, list, etc., configuration component 440 can disable, inactivate, etc. feature(s), component(s), device(s), etc. of UE 102 associated with the excluded communication service.

FIGS. 5-10 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
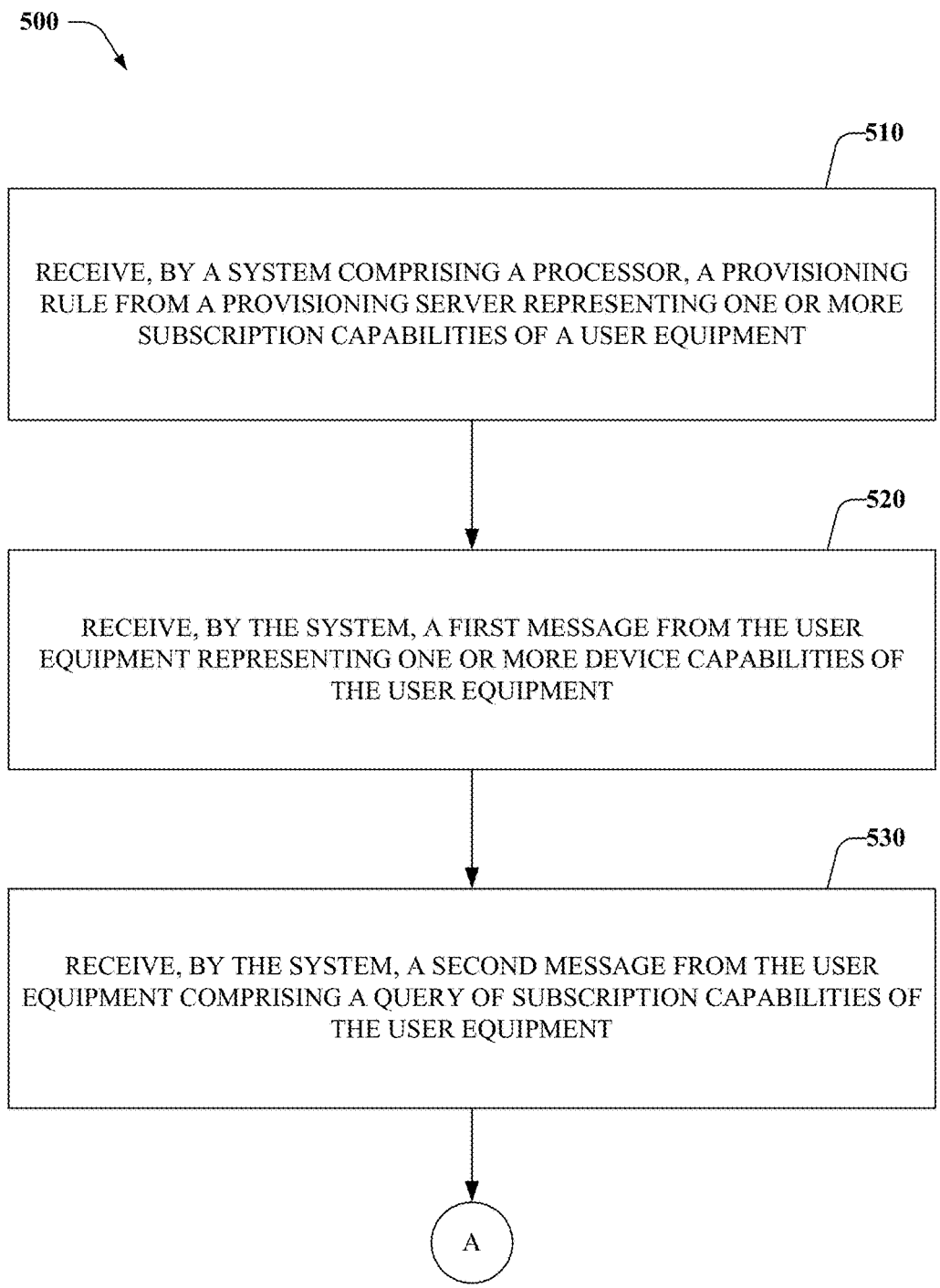
FIGS. 5-8 illustrate flowcharts of methods associated with a presence server, in accordance with various example embodiments.
Figure 6:
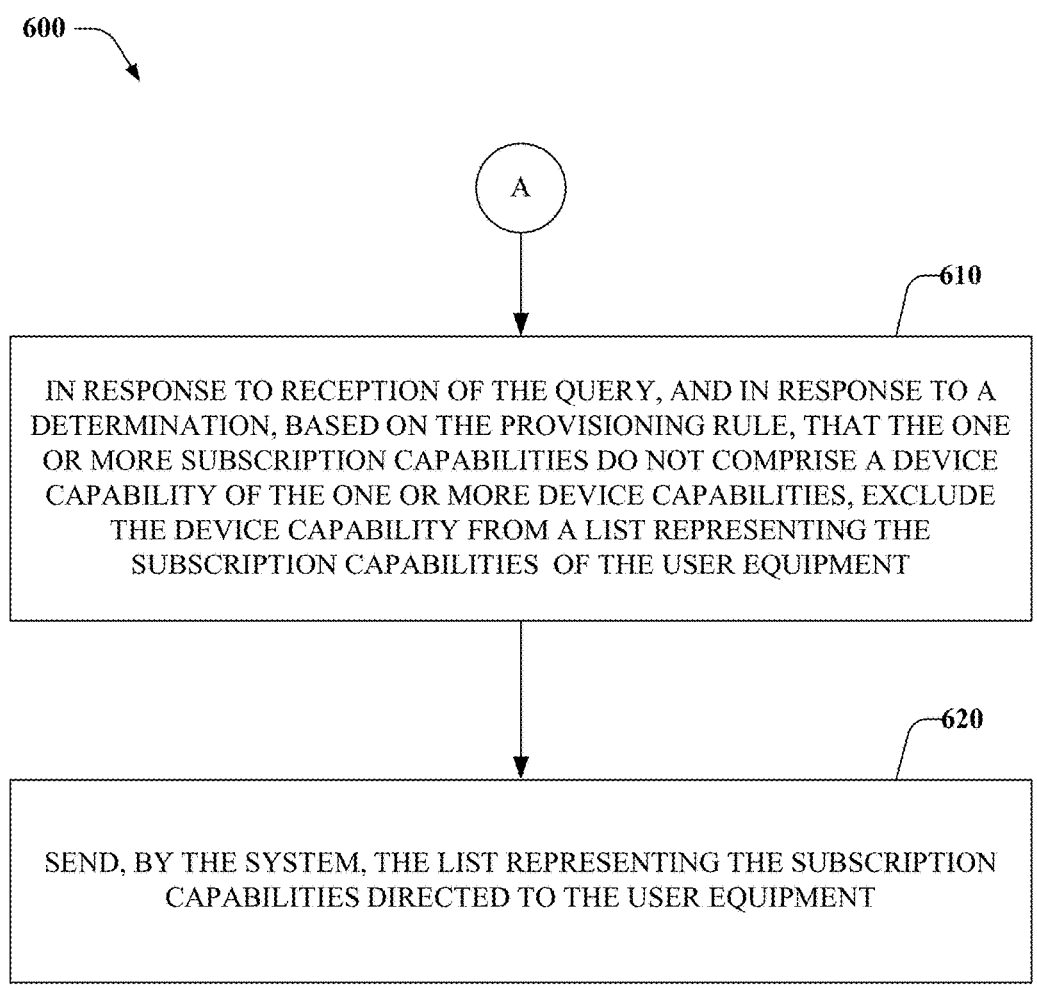

Referring now to FIGS. 5-6, processes 500 to 600 performed by presence server 220 are illustrated, in accordance with various example embodiments. At 510, presence server 220 can receive a provisioning rule from a provisioning server (210) representing one or more subscription capabilities of a UE. At 520, presence server 220 can receive a first message, e.g., an SIP PUBLISH message, from the UE representing one or more device capabilities of the UE. At 530, presence server 220 can receive a second message, e.g., an SIP SUBSCRIBE message, from the UE comprising a query of subscription capabilities of the UE.

At 610, in response to receipt of the query, and in response to a determination, based on the provisioning rule, that the one or more subscription capabilities do not comprise a device capability of the one or more device capabilities, presence server 220 can exclude the device capability from a list representing the one or more subscription capabilities of the UE. At 620, presence server 220 can send the list representing the one or more subscription capabilities directed to the UE.

Figure 7:
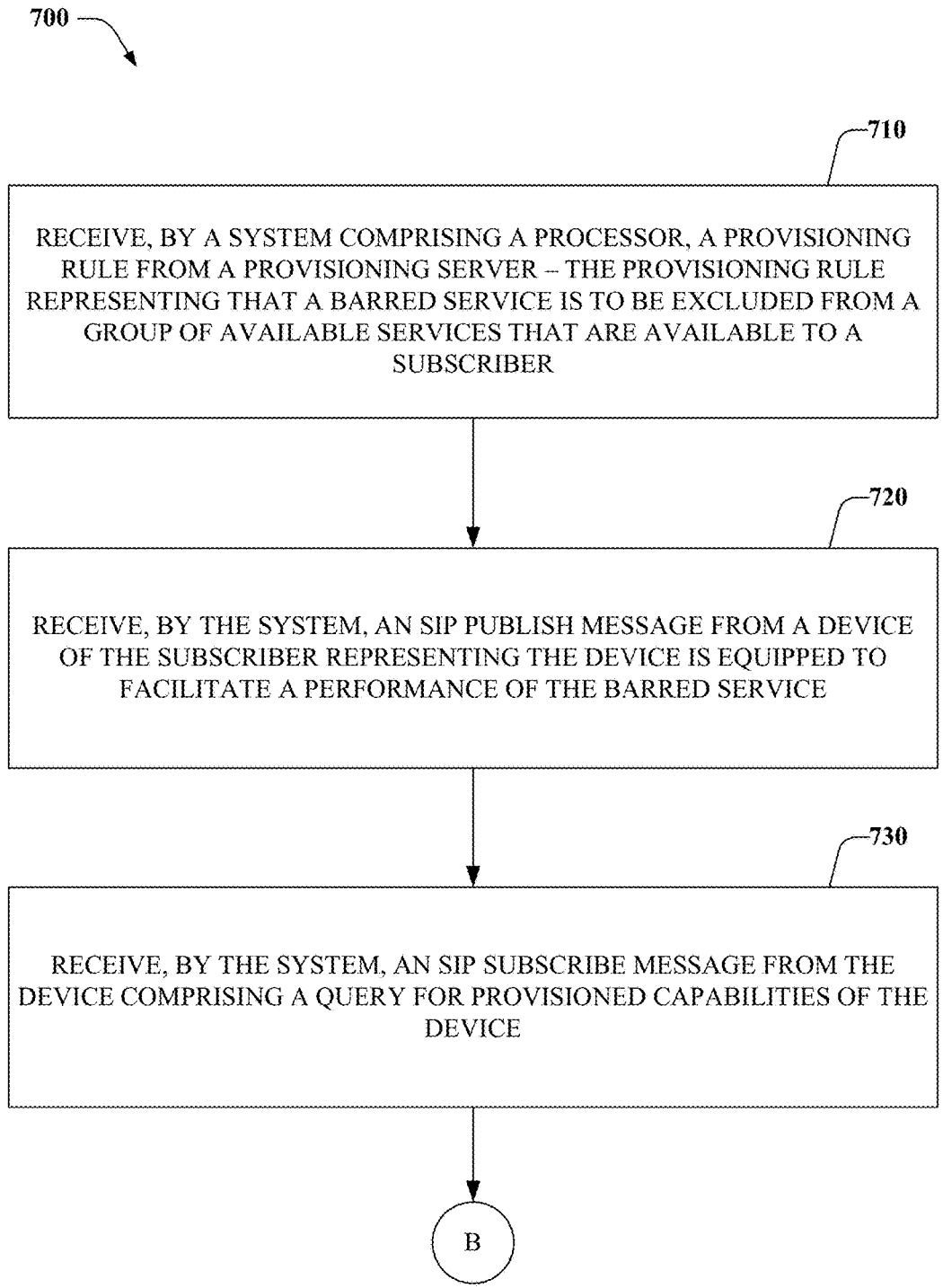
Figure 8:
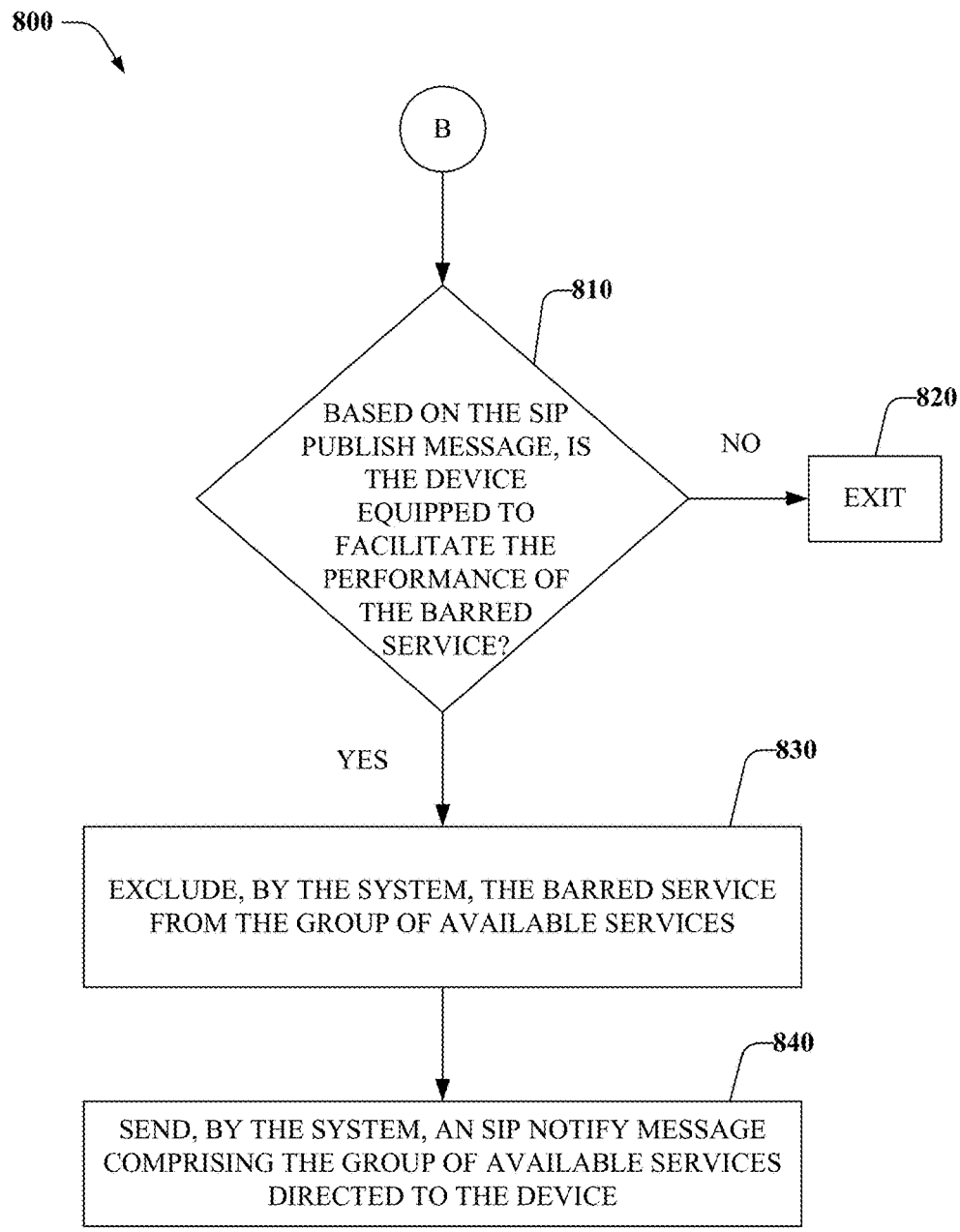

FIGS. 7-8 illustrate processes 700-800 performed by a system comprising a processor, e.g., presence server 220, in accordance with various example embodiments. At 710, the system can receive a provisioning rule from a provisioning server—the provisioning rule representing that a barred service is to be excluded from a group of available services that are available to a subscriber associated with a service provider of the available services.

At 720, the system can receive an SIP PUBLISH message from a device, e.g., a UE (102, 104, 106, 1120 (see below), etc.), a communication device, etc. of the subscriber representing the device is equipped to facilitate a performance of the barred service. At 730, the system can receive an SIP SUBSCRIBE message from the device comprising a query for provisioned capabilities of the device.

At 810, based on the SIP PUBLISH message, the system can determine whether the device is equipped to facilitate performance of the barred service. In this regard, in response to a determination that the device is not equipped to facilitate performance of the barred service, flow continues to 820, at which process 800 ends, exits, etc.; otherwise flow continues to 830, at which the system can exclude the barred service from the group of available services. Flow continues from 830 to 840, at which the system can send a notify message comprising the group of available services directed to the device.

Figure 9:
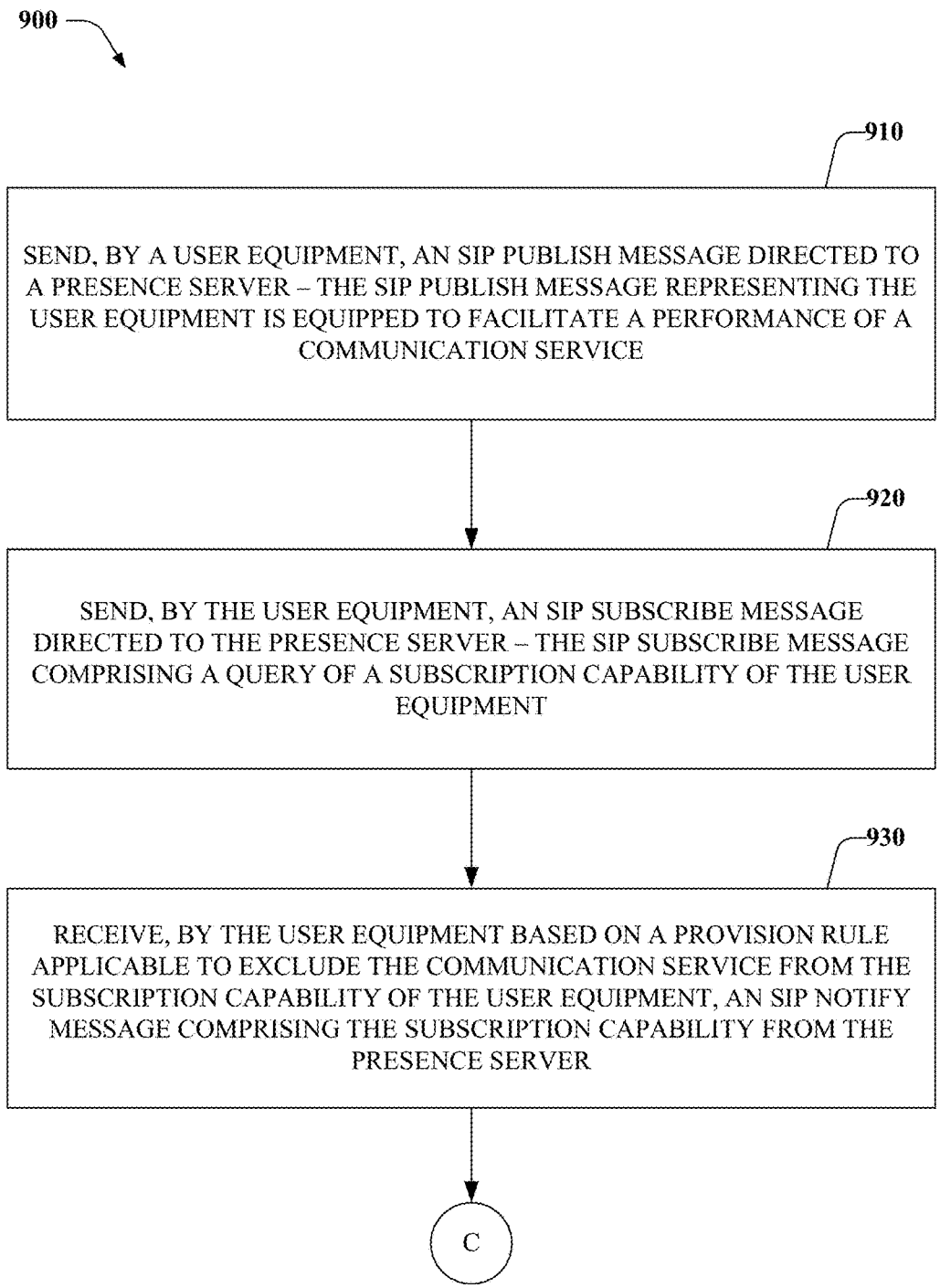
FIGS. 9-10 illustrate flowcharts of methods associated with a user equipment (UE), in accordance with various example embodiments.
Figure 10:
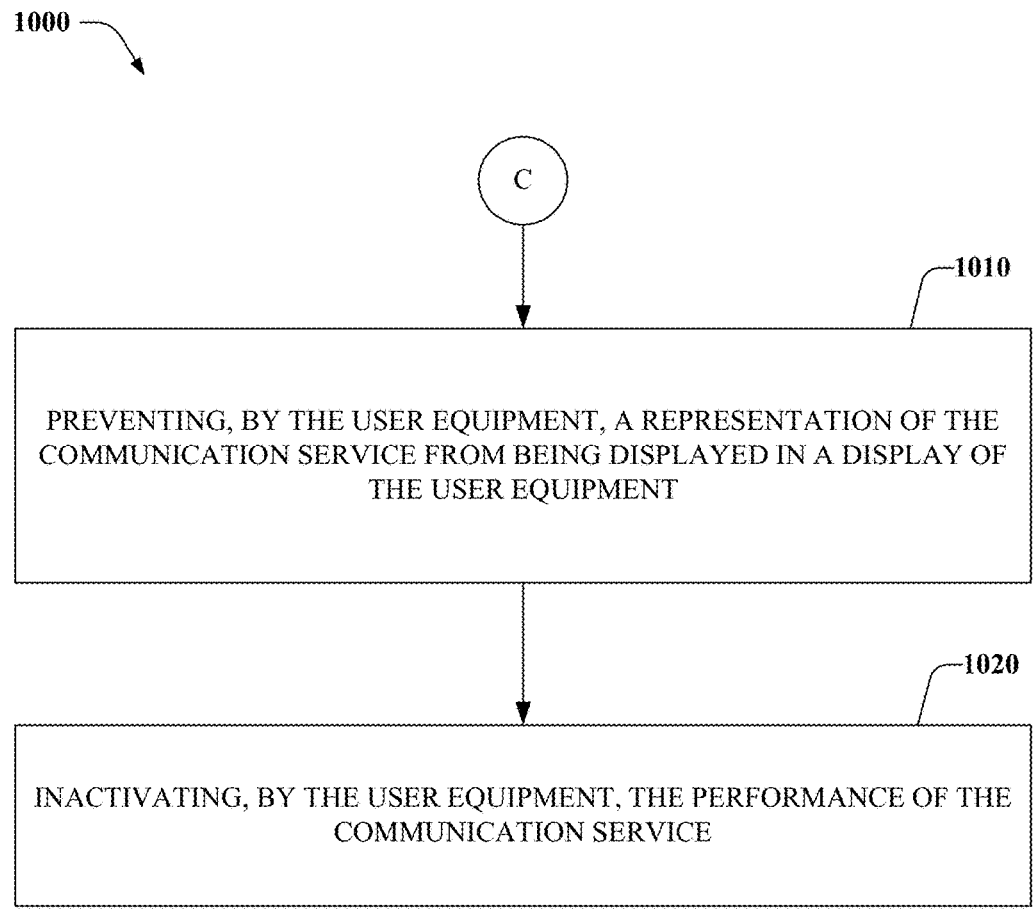

FIGS. 9-10 illustrate processes 900-1000 performed by a device, UE (e.g., 102, 104, 106, 1120 (see below)), etc. in accordance with various example embodiments. At 910, the UE can send an SIP PUBLISH message directed to a presence server (e.g. 220)—the SIP PUBLISH message representing the UE is equipped to facilitate a performance of a communication service.

At 920, the UE can send an SIP SUBSCRIBE message directed to the presence server—the SIP SUBSCRIBE message comprising a query of a subscription capability of the UE. At 930, the UE can receive, based on a provision rule applicable to exclude the communication service from the subscription capability of the UE, an SIP NOTIFY message comprising the subscription capability from the presence server.

At 1010, the UE can prevent a representation of the communication service from being displayed, e.g., via a GUI, in a display of the UE. At 1020, the UE can inactivate, disable, etc. the performance of the communication service, e.g., via disabling of components of the UE, etc.

Figure 11:
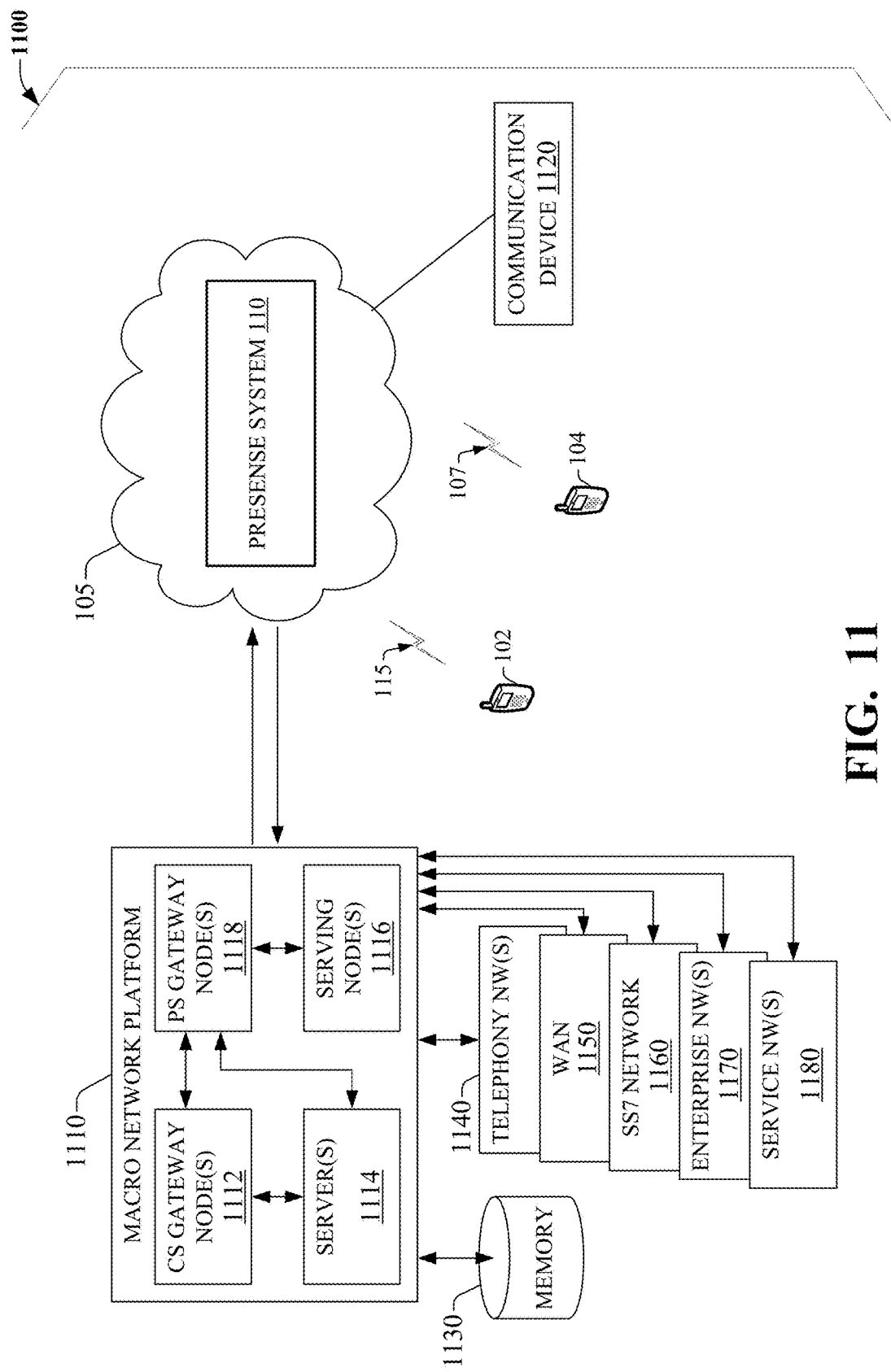
FIG. 11 illustrates a block diagram of a network environment, in accordance various example embodiments.

With respect to FIG. 11, a wireless communication environment 1100 including macro network platform 1110 is illustrated, in accordance with various embodiments. Macro network platform 1110 serves or facilitates communication with a device, e.g., 102, 104, 106, 1120 (e.g., a wired and/or wireless communication device), etc. via service provider network 105. Service provider network 105 can include base station(s), base transceiver station(s), access point(s), etc. and associated electronic circuitry and deployment site(s), in addition to a wireless radio link operated in accordance with the base station(s), etc. Accordingly, service provider network 105 can comprise various coverage cells, or wireless coverage areas. In addition, it should be appreciated that elements and/or components of presence system 110 can be located/included within one or more components/elements, e.g., hardware, software, etc., of wireless communication environment 1100, e.g., macro network platform 1110, service provider network 105, etc.

Generally, macro network platform 1110 includes components, e.g., nodes, gateways (GWs), interfaces, servers, platforms, etc. that facilitate both packet-switched (PS), e.g., IP, frame relay, asynchronous transfer mode (ATM), and circuit-switched (CS) traffic, e.g., voice and data, and control generation for networked wireless communication, e.g., via presence system 110. In various embodiments, macro network platform 1110 includes CS gateway (GW) node(s) 1112 that can interface CS traffic received from legacy networks like telephony network(s) 1140, e.g., public switched telephone network (PSTN), public land mobile network (PLMN), Signaling System No. 7 (SS7) network 1160, etc. CS GW node(s) 1112 can authorize and authenticate traffic, e.g., voice, arising from such networks. Additionally, CS GW node(s) 1112 can access mobility or roaming data generated through SS7 network 1160; for instance, mobility data stored in a visitor location register (VLR), which can reside in memory 1130. Moreover, CS GW node(s) 1112 interfaces CS-based traffic and signaling with PS GW node(s) 1118. As an example, in a 3GPP UMTS network, PS GW node(s) 1118 can be embodied in GW general packet radio service (GPRS) support node(s) (GGSN).

As illustrated by FIG. 11, PS GW node(s) 1118 can receive and process CS-switched traffic and signaling via CS GW node(s) 1112. Further PS GW node(s) 1118 can authorize and authenticate PS-based data sessions, e.g., via service provider network 105, with served devices, communication devices, etc. Such data sessions can include traffic exchange with networks external to the macro network platform 1110, like wide area network(s) (WANs) 1150; enterprise networks (NWs) 1170, e.g., E911, service NW(s) 1180, e.g., an IP multimedia subsystem (IMS), etc. It should be appreciated that local area network(s) (LANs), which may be a part of enterprise NW(s) 1170, can also be interfaced with macro network platform 1110 through PS GW node(s) 1118. PS GW node(s) 1118 can generate packet data contexts when a data session is established. To that end, in an aspect, PS GW node(s) 1118 can include a tunnel interface, e.g., tunnel termination GW (TTG) in 3GPP UMTS network(s) (not shown), which can facilitate packetized communication with disparate wireless network(s), such as WiFi networks. It should be further appreciated that the packetized communication can include multiple flows that can be generated through server(s) 1114. It is to be noted that in 3GPP UMTS network(s), PS GW node(s) 1118 (e.g., GGSN) and tunnel interface (e.g., TTG) comprise a packet data GW (PDG).

Macro network platform 1110 also includes serving node(s) 1116 that can convey the various packetized flows of information, or data streams, received through PS GW node(s) 1118. As an example, in a 3GPP UMTS network, serving node(s) can be embodied in serving GPRS support node(s) (SGSN).

As indicated above, server(s) 1114 in macro network platform 1110 can execute numerous applications, e.g., messaging, location services, wireless device management, etc. that can generate multiple disparate packetized data streams or flows; and can manage such flows, e.g., schedule, queue, format. Such application(s), for example can include add-on features to standard services provided by macro network platform 1110. Data streams can be conveyed to PS GW node(s) 1118 for authorization/authentication and initiation of a data session, and to serving node(s) 1116 for communication thereafter. Server(s) 1114 can also effect security, e.g., implement one or more firewalls, of macro network platform 1110 to ensure network's operation and data integrity in addition to authorization and authentication procedures that CS GW node(s) 1112 and PS GW node(s) 1118 can enact. Moreover, server(s) 1114 can provision services from external network(s), e.g., WAN 1150, or global positioning system (GPS) network(s), which can be a part of enterprise NW(s) 1180. It is to be noted that server(s) 1114 can include one or more processors configured to confer at least in part the functionality of macro network platform 1110. To that end, the one or more processors can execute code instructions stored in memory 1130, for example.

In wireless communication environment 1100, memory 1130 can store information related to operation of macro network platform 1110, e.g., related to operation of presence system 110. The information can include business data associated with subscribers; market plans and strategies, e.g., promotional campaigns, business partnerships, mobile devices served through macro network platform, etc.; service and privacy policies; end-user service logs for law enforcement; term(s) and/or condition(s) associated with wireless service(s) provided via service provider network 105; and so forth. Memory 1130 can also store information from at least one of telephony network(s) 1140, WAN 1150, SS7 network 1160, enterprise NW(s) 1170, or service NW(s) 1180.

In one or more embodiments, components of core network environment 1100 can provide communication services to a wireless device, e.g., 102, 104, 106, etc. via service provider network 105 utilizing an over-the-air wireless link (not shown). In this regard, service provider network 105 can include one or more: macro, Femto, or pico access points (APs) (not shown); base stations (BS) (not shown); landline networks (e.g., optical landline networks, electrical landline networks) (not shown) communicatively coupled between the wireless device, e.g., 102, 104, 106, etc. and macro network platform 1310. Further, the over-the-air wireless link can comprise a downlink (DL) and an uplink (UL) (both not shown) that can utilize a predetermined band of radio frequency (RF) spectrum associated with any number of various types of wireless technologies including, but not limited to, cellular, LTE, LTE-A, GSM, 3GPP UMTS, WiFi, WiMax, wireless local area networks (WLAN), Femto, etc.

Core network environment 1100, e.g., service provider network 105, etc. can include one or more of the Internet (or another communication network (e.g., IP-based network)), or a digital subscriber line (DSL)-type or broadband network facilitated by Ethernet or other technology. In various embodiments, core network environment 1100 can include hardware and/or software for allocating resources to a device, e.g., 102, 104, 106, 1120, etc., converting or enforcing protocols, establishing and/or providing levels of quality of service (QoS), providing applications or services, translating signals, and/or performing other desired functions to facilitate system interoperability and communication to/from the device, e.g., 102, 104, 106, 1120, etc.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "memory storage," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 224, subscriber profile data store 230, non-volatile memory 1222 (see below), disk storage 1224 (see below), and/or memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory 1220 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
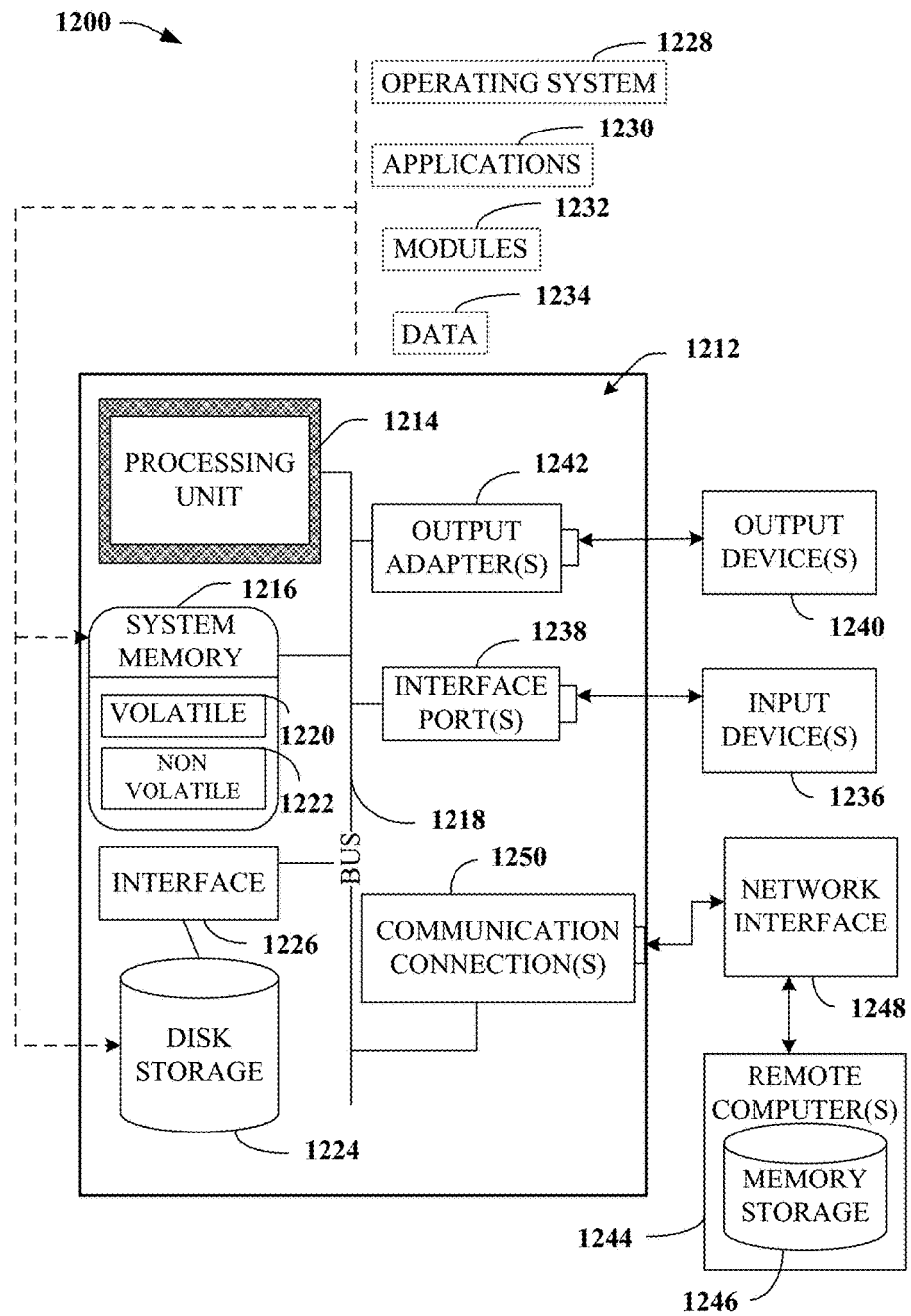
FIG. 12 illustrates a block diagram representing an illustrative non-limiting computing system or operating environment in which one or more aspects of various embodiments described herein can be implemented.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed systems and methods is illustrated, in accordance with an embodiment. Computer 1212 includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, industrial standard architecture (ISA), microchannel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1216 includes volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands or information into computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1214 through system bus 1218 via interface port(s) 1238. Interface port(s) 1238 include, for example, a serial port, a parallel port, a game port, a universal serial bus (USB), a wireless based port, e.g., WiFi, Bluetooth, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240, like display devices, light projection devices, monitors, speakers, and printers, among other output devices 1240, which use special adapters. Output adapters 1242 include, by way of illustration and not limitation, video and sound devices, cards, etc. that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically and/or wirelessly connected via communication connection 1250. Network interface 1248 encompasses wire and/or wireless communication networks such as local-area networks (LAN) and wide-area networks (WAN). LAN technologies include fiber distributed data interface (FDDI), copper distributed data interface (CDDI), Ethernet, token ring and the like. WAN technologies include, but are not limited to, point-to-point links, circuit switching networks like integrated services digital networks (e.g., ISDN) and variations thereon, packet switching networks, and digital subscriber lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, wireless modems, ISDN adapters, and Ethernet cards.

The computer 1212 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1212 can connect to other devices/networks by way of antenna, port, network interface adaptor, wireless access point, modem, and/or the like.

The computer 1212 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least WiFi and Bluetooth wireless technologies. Thus, the communication can be a predefined structure as with a conventional network or simply an ad hoc communication between at least two devices.

WiFi allows connection to the Internet from a desired location (e.g., a vehicle, couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Further, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art.

As utilized herein, terms "component," "system," "server," "interface," and the like are intended to refer to a computer-related entity, hardware, software (e.g., in execution), and/or firmware. For example, a component can be a processor, a process running on a processor, an object, an executable, a program, a storage device, and/or a computer.

By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via presence server 220, to perform operations comprising: in response to receiving an SIP SUBSCRIBE message, and in response to determining, based on an SIP PUBLISH message, that a UE is equipped to facilitate a performance of a barred service, excluding the barred service from a list, group, etc. of available services resulting in a modified list, group, etc. of available services, and sending an SIP NOTIFY message comprising the modified list, group, etc. of available services directed to the UE.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, services, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of event notifications reported by a file system, e.g., corresponding to checksum error(s), receiving operator preferences, receiving historical information, receiving extrinsic information, etc. For example, support vector machines can be configured via a learning or a training phase within a classifier constructor and feature selection module. Thus, the classifier(s) can be used by an artificial intelligence system to automatically learn and perform a number of functions, e.g., performed by presence system 110, a UE 102, etc.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Aspects, features, and/or advantages of the disclosed subject matter can be exploited in substantially any wired telecommunication technology and/or any wireless telecommunication or radio technology, e.g., IEEE 802.XX technology, e.g., WiFi, Bluetooth, etc; WiMAX; enhanced GPRS; 3GPP LTE; 3GPP 2 (3GPP2); ultra mobile broadband (UMB); 3GPP UMTS; high speed packet access (HSPA); high speed downlink packet access (HSDPA); high speed uplink packet access (HSUPA); LTE-A, GSM, near field communication (NFC), Wibree, WiFi Direct, etc.

Further, selections of a radio technology, or radio access technology, can include second generation (2G), third generation (3G), fourth generation (4G), fifth generation (5G), etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, terms like "user equipment" (UE), "mobile station," "mobile subscriber station," "access terminal," "terminal", "handset," "appliance," "machine," "wireless communication device," "cellular phone," "personal digital assistant," "smartphone," "wireless device", "communication device," "device," and similar terminology refer to a wired and/or wireless device, or wired and/or wireless communication device, which is at least one of (1) utilized by a subscriber of a wired and/or wireless service, communication service, etc. to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., corresponding to a communication environment for facilitating device querying of service entitlement status (see e.g., 100, 300, 1100, etc.), for systems, methods, and/or apparatus disclosed herein can include any suitable mobile and/or wireline-based circuit-switched communication network including a GSM network, a time division multiple access (TDMA) network, a code division multiple access (CDMA) network, such as IS-95 and subsequent iterations of CDMA technology, an integrated digital enhanced network (iDEN) network, a public switched telephone network (PSTN), etc. Further, examples of the communication network can include any suitable data packet-switched or combination data packet/circuit-switched communication network, wired or wireless IP network such as a VoLTE network, a VoIP network, an IP data network, a UMTS network, a GPRS network, or other communication networks that provide streaming data communication over IP and/or integrated voice and data communication over combination data packet/circuit-switched technologies.

Similarly, one of ordinary skill in the art will appreciate that a device, communication device, UE, etc. (see e.g., 102, 104, 106, 1120, etc.) for systems, methods, and/or apparatus disclosed herein can include a wireless device, a wired device, e.g., physically coupled to the communication network, a mobile device, a mobile phone, a 4G, a 5G, etc. cellular communication device, a PSTN phone, a cellular communication device, a cellular phone, a satellite communication device, a satellite phone, a VoIP phone, WiFi phone, a dual-mode cellular/WiFi phone, a combination cellular/VoIP/WiFi/WiMAX phone, a smartphone, a laptop device, a tablet device, a television device, a vehicle device, a home security system device, a portable computer, or any suitable combination thereof. Specific examples of a wireless system can include, but are not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones, UMTS VoIP phones, or like devices or combinations thereof.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   first receiving, by a system comprising a processor, a provisioning rule representing that a barred service is to be excluded from a group of available services that are available to a subscriber;
   second receiving, by the system from a user equipment, a first message representing that the user equipment is equipped to facilitate a performance of the barred service; and
   in response to third receiving, by the system from the user equipment, a second message comprising a request for the group of available services, and in response to determining, based on the first message, that the user equipment is equipped to facilitate the performance of the barred service,
      excluding the barred service from the group of available services resulting in a modified group of available services, and
      sending a third message comprising the modified group of available services directed to the user equipment to facilitate preventing a representation of the barred service from being displayed via a display of the user equipment.

2. The method of claim 1, wherein the second receiving comprises receiving a session initiation protocol publish message representing that the user equipment is equipped to facilitate the performance of the barred service.

3. The method of claim 2, wherein the third receiving comprises receiving a session initiation protocol subscribe message comprising the request for the group of available services, and wherein the session initiation protocol subscribe message comprises an integrated services digital network directory number identifying the user equipment.

4. The method of claim 3, wherein the sending the third message comprises sending a session initiation protocol notify message comprising the group of available services directed to the user equipment.

5. The method of claim 1, wherein the group of available services comprises a rich communication suite service.

6. The method of claim 5, wherein the barred service comprises an IR.94 based video service.

7. The method of claim 5, wherein the barred service comprises a chat session conducted pursuant to an open mobile alliance protocol.

8. A system, comprising:
   a processor; and
   a memory that stores executable instructions that, when executed by the processor, facilitate performance of operations, the operations comprising:
      receiving, from a provisioning device, a provisioning rule that facilitates exclusion of a service from a group representing provisioned services corresponding to a communication device;
      receiving, from the communication device, a publish message representing the communication device is capable of facilitating a performance of the service;
      receiving, from the communication device, a subscribe message requesting confirmation of a subscription capability of the communication device; and
      in response to the receiving the subscribe message, and in response to determining, based on the publish message, that the communication device has published support for facilitation of the performance of the service,
         excluding, based on the provisioning rule, the service from the group representing the provisioned services resulting in a modified group, and
         sending a notify message comprising the modified group directed to the communication device to facilitate preventing a selection item representing the service from being displayed via the communication device.

9. The system of claim 8, wherein the preventing comprises:
   inactivating the performance of the service.

10. The system of claim 8, wherein the publish message comprises a session initiation protocol publish message.

11. The system of claim 8, wherein the subscribe message comprises a session initiation protocol subscribe message comprising an integrated services digital network directory number identifying the communication device.

12. The system of claim 8, wherein the notify message comprises a session initiation protocol notify message comprising the group.

13. The system of claim 8, wherein service comprises a rich communication suite service.

14. The system of claim 13, wherein the rich communication suite service comprises a video service.

15. The system of claim 13, wherein the rich communication suite service comprises a chat service.

16. A non-transitory machine-readable storage medium, comprising executable instructions that, when executed by a processor of a device, facilitate performance of operations, comprising:
   sending a session initiation protocol publish message directed to a presence server device, wherein the session initiation protocol publish message represents the device is equipped to facilitate a performance of a service;
   in response to the sending the session initiation protocol publish message, sending a session initiation protocol subscribe message directed to the presence server device, wherein the session initiation protocol subscribe message comprises a query of a subscription capability of the device;
   in response to the sending the session initiation protocol subscribe message, receiving, based on a provision rule applicable to exclude the service from the subscription capability of the device, a session initiation protocol notify message comprising the subscription capability from the presence server device; and in response to the receiving the session initiation protocol notify message comprising the subscription capability of the device, preventing a representation of the service from being displayed via a display of the device.

17. The non-transitory machine-readable storage medium of claim 16, wherein the session initiation protocol subscribe message comprises an integrated services digital network directory number identifying the device.

18. The non-transitory machine-readable storage medium of claim 16, wherein the service comprises a rich communication suite service.

19. The non-transitory machine-readable storage medium of claim 16, wherein the operations further comprise:

in response to the receiving the session initiation protocol notify message, disabling a feature of the device corresponding to the service.

20. The non-transitory machine-readable storage medium of claim 19, wherein the disabling the feature of the device comprises:

inactivating, via the device, the performance of the service.

\* \* \* \* \*